R. VUILLEUMIER.
BELT.
APPLICATION FILED APR. 1, 1913.

1,177,664.

Patented Apr. 4, 1916.

Witnesses:
Eric B. Kramer
Jesse A. Holton

Inventor
R. Vuilleumier
By his Attorneys
Dull, Warfield Dull

UNITED STATES PATENT OFFICE.

RUDOLPH VUILLEUMIER, OF NEW ROCHELLE, NEW YORK, ASSIGNOR TO THE SAFETY CAR HEATING AND LIGHTING CO., OF NEW YORK, N. Y., A CORPORATION OF NEW JERSEY.

BELT.

1,177,664.      Specification of Letters Patent.      Patented Apr. 4, 1916.

Application filed April 1, 1913. Serial No. 758,193.

*To all whom it may concern:*

Be it known that I, RUDOLPH VUILLEUMIER, a citizen of the United States, residing at New Rochelle, in the county of Westchester and State of New York, have invented certain new and useful Improvements in Belts, of which the following is a full, clear, and exact description, such as will enable others skilled in the art to which it appertains to make and use the same.

The present invention relates to power transmission mechanisms, and with regard to certain more specific features thereof, to belts adapted to connect resiliently one rotating body with another.

One of the objects of the present invention is to provide an inexpensive belt which will be simple and durable in construction, and in which the material employed will be economically and efficiently used.

Another object is to provide a belt in which slipping will be reduced to a minimum and will not increase in length or stretch under long continued use.

A further object is to provide a commercially practicable resilient belt in which friction is reduced to a minimum.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

Figure 1:
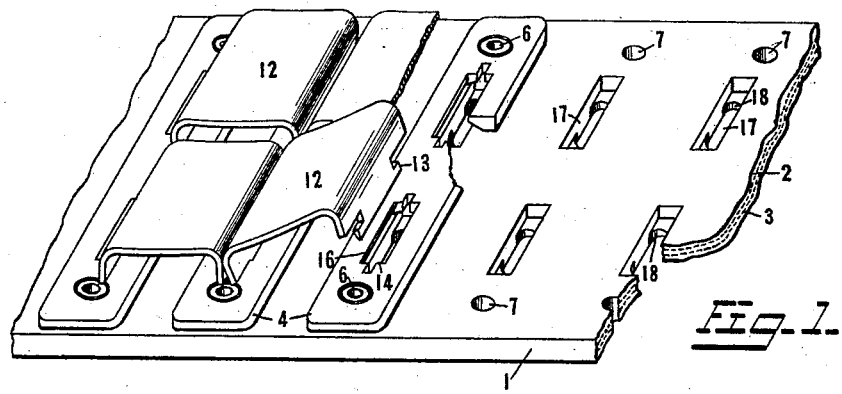
Figure 2:
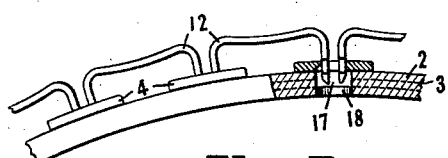
Figure 3:
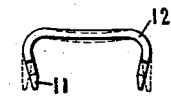
Figure 5:
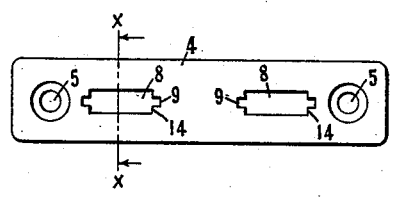
Figure 4:
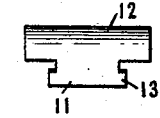
Figure 6:

In the accompanying drawing, Figure 1 is a perspective view of a section of the belt with certain parts removed or broken away in order to better illustrate the invention; Fig. 2 is an elevational view partly in section, of a portion of the belt in the curved position assumed when passing over one of the roller bodies; Fig. 3 is an end elevation of one of the resilient members forming a portion of the belt, showing its extended position in dotted lines; Fig. 4 is a side elevation of the same; Fig. 5 is a plan view of an attaching member; and Fig. 6 is a cross-section taken on the line X—X, Fig. 5.

Similar reference characters refer to similar parts throughout the different views of the drawing.

Referring now to the drawing in detail and more particularly to Fig. 1, the body portion 1 of the belt comprises a plurality of superimposed layers preferably of rubber and canvas 2 and 3, respectively, in order to provide a durable and strong body portion having the desired frictional surface for contact with the pulleys or other roller means adapted to be connected thereby. This body portion is provided with a plurality of transverse attaching plates or members 4, in practice slightly spaced apart throughout the length of the belt on its outer surface. These plates are provided with countersunk holes 5 at each end thereof through which pass rivets 6 forming a connection with the belt through holes 7 therein. These rivets are flanged over on the under side to prevent removal. Intermediate the openings 5 are two longitudinal openings 8 which are rectangular in shape and provided with notched portions 9 at each end of each opening. These openings are adapted to receive the downwardly turned ends 11 of relatively flat or U-shaped resilient tie members 12 connecting and interlocking with adjacent plates 4. These spring members 12, shown in detail in Figs. 3 and 4, are preferably made of resilient sheet steel, copper-plated and then oxidized to prevent rusting. The downwardly turned ends 11 are T-shaped, or in other words, are provided with laterally extending lugs 13 at each end adapted to pass through the notches 9 in the holes 8 and catch under the corners 14 formed by the body portion of the plate by the hole 8 and the notches 9. It will thus be seen that these spring members 12 may be easily slipped into place by bending the belt in a curve opposite from that shown in Fig. 2. On releasing the belt it will tend to assume a flat position as shown in Fig. 1, in which the spring members 12 are locked against removal. It will be noted that the ends of the spring members 12 are slightly beveled or tapered along the direction of their length in order that they may be more easily inserted in the openings 8 and in order to provide a freer and easier rocking movement as the belt goes about the pulley. The side edges of the opening 8 are also beveled or provided with a knife-edge 16. The spring plates 12 are preferably arranged in pairs transversely of the belt to provide greater strength and also to eliminate the chance of accident which might be caused by breaking if the connecting members should be made in one part.

In order to provide sufficient space for the rocking movement of the ends 11 of the springs, recesses or holes 17 are cut in the belt as shown clearly in Fig. 1. The general shape of these holes is rectangular in the upper part and elliptical, as indicated by the curved ends 18, in the lower part; an advantage of this construction is the permitting of a greater freedom of movement of the downwardly turned ends 11 and a slight reduction of the weight of the belt without materially affecting the extent of frictional surface on the under side.

In making a belt of this character after providing the desired number of sheets or layers of canvas and rubber and securely cementing them together, the entire belt is slightly compressed in the direction of its length; the attaching plates 4 are then applied at regular intervals the desired distance apart, after which the spring members 12 are successively interfitted therewith. On releasing the longitudinal compression of the belt it assumes a natural position securely holding the several tension members or plates 12 in proper position, thus positively preventing the accidental removal thereof. A further advantage in a construction of this manner resides in the fact that the springs 12 are of sufficient stiffness to constantly prevent the belt from being stretched beyond the normal limits of elasticity, thus increasing its length and producing an abnormal amount of slack between the pulleys which it is adapted to connect. In other words, the belt maintains a substantially constant length and tension on the driving and driven members which length will not materially increase by long continued use. The centrifugal action exerted upon the belt as it passes about the pulley tends to relieve the strain upon the bearings.

The form of spring shown and described is of particular value because it permits the least amount of metal to be used to the greatest advantage. The bending moment at any point of a spring is proportional to the normal distance from the line of application of the force. In the present case the force is applied to the spring member at the points of contact therewith of the knife edges 16 of the transverse plates 4. The bending moment will be greatest at points of the spring farthest from a line passing through the knife edges. Since all points of the flat portion of the spring are at approximately the same distance from the line of application of the force, a constant bending moment will be exerted throughout the flat portion of the spring member. It follows from this fact that the greatest reaction to bending will be exerted by that portion of the spring member that has the greatest amount of metal in it. By this construction there is obtained a spring which permits metal of uniform thickness to have the highest resiliency and therefore to exert the maximum effect for its weight.

It is thus seen that this invention provides a simple and practical form of belt which will be inexpensive to manufacture due to the ease with which the various parts may be assembled. It is durable and highly efficient in use and, as a whole, is believed to accomplish, among others, all the objects and advantages above set forth.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense. It is also to be understood that the language used in the following claims is intended to cover all of the generic and specific features of the invention herein described, and all statements of the scope of the invention which, as a matter of language, might be said to fall therebetween.

Having described my invention, what I claim as new and desire to secure by Letters Patent is:

1. In a belt, in combination, a body portion, attaching plates secured to the outer surface thereof, and a plurality of pairs of relatively flat springs connecting adjacent plates, said plates and springs being formed to permit removal of the springs when the belt is reversely curved.

2. In a belt, in combination, a body portion, a plurality of attaching plates spaced at regular intervals along the outer surface, and a plurality of spring members connecting said attaching plates and normally interlocked therewith, said spring members being formed to permit removal when the belt is reversely curved from normal position.

3. In a belt, in combination, a body portion, a plurality of attaching plates riveted thereto at regular intervals, and resilient members adapted to expand in the direction of the length of belt having T-shaped portions adapted to interlock with said transversely disposed plates and hold the belt against stretching, the coacting edges of said plates and resilient members being formed to reduce friction.

4. In a belt, in combination, a body portion, a plurality of attaching plates riveted thereto at regular intervals, and resilient members adapted to expand in the direction of the length of the belt having portions adapted to interlock with said transversely disposed plates and hold the belt against stretching, one of the coacting edges of said transverse plates and resilient members being provided with a knife edge to reduce friction.

5. In a belt, in combination, a body portion having a series of openings therein, plates surrounding said openings, and longitudinally expansible members coacting with said plates and having a rocking movement in said openings.

6. In a belt, in combination, a body portion having a series of openings therein, plates surrounding said openings, and longitudinally expansible resilient members coacting with said plates and adapted to prevent stretching of the belt, said members adapted to have a rocking movement in said openings as the belt passes around a pulley.

7. In a belt, in combination, a body portion and a series of openings therein, attaching plates secured to the outer surface of said body portion and having holes registering with said recesses, and longitudinally expansible members coacting with the holes in said plates adapted to prevent permanent stretching of the belt, said expansible members having an interlocking engagement with said plates.

8. In a belt, in combination, a body portion having a series of openings therein, attaching plates secured to the outer surface of said body portion and having holes registering with said recesses, and longitudinally expansible members coacting with the holes in said plates adapted to prevent permanent stretching of the belt, said expansible members being adapted to move to a position whereby they may be bodily removed from the belt when the belt is reversely curved.

9. In a belt, in combination, a body portion, attaching means secured thereto at intervals, resilient members connecting said means adapted to prevent a permanent stretching of the belt, and a knife edge connection between said means and members.

In testimony whereof I affix my signature, in the presence of two witnesses.

RUDOLPH VUILLEUMIER.

Witnesses:
  E. E. ALBEE,
  C. J. KULBERG.

Copies of this patent may be obtained for five cents each, by addressing the "Commissioner of Patents, Washington, D. C."